United States Patent [19]

Touro

[11] Patent Number: 4,726,939

[45] Date of Patent: Feb. 23, 1988

[54] PROCESS FOR THE REMOVAL OF MERCURY FROM PRECIOUS METAL-CYANIDE LIQUORS

[76] Inventor: Freddie J. Touro, 61 Park Timbers Dr., New Orleans, La. 70114

[21] Appl. No.: 812,919

[22] Filed: Dec. 23, 1985

[51] Int. Cl.$^4$ .............................................. C10G 13/00
[52] U.S. Cl. ..................................... 423/101; 423/29; 423/37; 423/42; 423/109; 75/106; 75/108; 75/118 R; 210/705
[58] Field of Search ...................... 423/27, 26, 29, 30, 423/37, 101, 109; 75/2, 97 A, 101 R, 106, 105, 108, 118 R, 121; 210/702, 705, 723

[56] References Cited

U.S. PATENT DOCUMENTS

| | | | |
|---|---|---|---|
| 935,337 | 9/1909 | Thwaites | 75/121 |
| 1,198,086 | 9/1916 | Vandercook | 423/29 |
| 4,072,587 | 2/1978 | Heinen et al. | 423/29 |
| 4,188,208 | 2/1980 | Guay | 75/118 R |
| 4,256,707 | 3/1981 | Flynn, Jr. et al. | 423/101 |
| 4,289,532 | 9/1981 | Matson et al. | 423/29 |

*Primary Examiner*—Robert L. Stoll
*Attorney, Agent, or Firm*—Fisher, Christen & Sabol

[57] ABSTRACT

This invention is a process for removing mercury from the desorption or cyanide liquor of a precious metal recovery, cyanide leach system. A sulfide ion-producing compound and a flocculating agent are added to the desorption liquor to form and flocculate mercuric sulfide. The desorption liquor typically has a cyanide concentration of between about 0.5 percent and about 2.0 percent by weight. The flocculated mercuric sulfide is separated from a substantially mercury-free precious metal-containing, cyanide solution.

10 Claims, 1 Drawing Figure

PROCESS FOR THE REMOVAL OF MERCURY FROM PRECIOUS METAL-CYANIDE LIQUORS

BACKGROUND OF THE INVENTION

1. FIELD OF THE INVENTION

This invention relates to a process for removing mercury from a cyanide liquor of a precious metal, cyanide leach solution. In particular this invention relates to a process for removing mercury from a secondary circuit cyanide liquor by reacting the mercury with a sulfide ion-providing compound and flocculating the mercury sulfide contained in the secondary circuit cyanide liquor.

2. DESCRIPTION OF THE PRIOR ART

Cyanide leach, carbon-in-pulp systems commonly used in precious metal extracting plants combine cyanide leaching, carbon adsorption, and carbon desorption steps to recover precious metal from refractory ores. The steps in precious metal extraction processes involving the initial cyanide leaching constitute the "primary circuit" of the processes. The steps in precious metal extraction processes involving the desorption of the precious metal from activated carbon constitute the "secondary circuit" of the processes. The secondary circuit also employs a cyanide-containing solution.

U.S. Pat. Nos. 4,188,208 to Guay and 4,289,532 to Matson et al. disclose "binary" or two circuit systems for recovering precious metals from carbonaceous ores. Carbonaceous ores contain refractory carbon material that inhibits or substantially reduces the effectiveness of conventional cyanidation techniques for extracting the precious metals from the ore.

The Matson patent, which is herein incorporated by reference, is illustrative of a cyanide leach, carbon-in-pulp precious metal recovery system. In the Matson patent the primary circuit involves the cyanide leaching of precious metal values from precious metal-containing, carbonaceous ores and the adsorption of those leached precious metal values onto activated carbon. The dissolved cyanide content of a primary circuit is considered to be low and is typically in a concentration between about 0.01 percent and about 0.1 percent by weight of the ore. A secondary circuit as typically used with the process disclosed in the Matson patent involves the desorption of the adsorbed precious metals from the precious metal-loaded activated carbon by a cyanide stripping solution. The secondary circuit also includes the recovery of the desorbed precious metals from the desorption solution. The dissolved cyanide content of the secondary circuit desorption liquor is significantly higher than the dissolved cyanide content of the primary circuit. The dissolved cyanide content of the secondary circuit is typically between about 0.5 percent and about 2.0 percent by weight of the ore. A high cyanide concentration increases the solubility of precious and other metals.

Mercury is often found in gold-containing ores and its presence results in problems throughout gold recovery plants which use cyanide leaching and carbon adsorption. Both mercury and gold are readily solubilized when leached with a cyanide solution. Solubilized mercury and gold are both adsorbed onto activated carbon when the activated carbon is contacted with a mercury and gold-containing, cyanide solution. The adsorption of mercury onto the activated carbon reduces the availability of the activated carbon for the adsorption of the precious metal. Subsequent desorption of the metal-loaded activated carbon by a cyanide stripping solution results in the desorption of both mercury and gold. Mercury therefore becomes a contaminant of the precious metal.

One conventional process for the removal of mercury from mercury-contaminated gold includes a distillation operation. In the distillation operation the gold and mercury recovered from a conventional cyanide leach, carbon-in-pulp system are heated in a furnace to a temperature that is sufficient to vaporize or "distill off" the mercury from the gold. The distilled mercury is collected in a condenser and can be sold or otherwise disposed in an environmentally safe manner. This distillation operation is expensive due to the high cost of equipment and energy. The distillation operation produces toxic mercury vapors. For these reasons the removal of as much mercury as possible from a cyanide leach system prior to a distillation operation is desirable to reduce the magnitude of a mercury distillation operation.

U.S. Pat. No. 4,256,707 to Flynn et al. discloses a process for selectively removing mercury from gold-cyanide solutions. A mercuric sulfide precipitate is formed by adding silver sulfide ($Ag_2S$), zinc sulfide (ZnS), or iron sulfide (FeS) to the gold-cyanide solution. The examples in Flynn disclose cyanide solutions containing 0.05% cyanide by weight. This cyanide concentration is representative of cyanide concentrations in the primary circuits of cyanide leach, gold recovery systems.

There are several disadvantages associated with the precipitation of mercuric sulfide from primary circuit cyanide solutions such as those disclosed in the Flynn patent. First, when sulfides are added to the dilute cyanide solution of the primary circuit, a diffuse, hard-to-settle mercuric sulfide precipitate is produced which Flynn states "flocculated after about 40 hours". A solution existing as a colloidal suspension for 40 hours is representative of a "nondeflocculated system". This is evidenced by the fact that only 60 percent of the mercury in the original solution in the Flynn patent was removed following centrifugation and filtration when $Na_2S$ was used as a sulfiding agent. Separating a diffuse mercuric sulfide precipitate from solution by centrifugation is not a process readily adapted to a commercial scale gold extraction process. A second disadvantage of sulfide precipitation of mercury in the primary circuit of a gold extraction process is the loss of gold from the dilute cyanide solution. The low concentration of cyanide in a primary circuit results in decreased solubility of the gold-cyanide complexes when compared to the strongly solubilized gold-cyanide complexes of a secondary circuit. A larger portion of the complexed gold in a primary circuit precipitates upon the addition of sulfide to the liquor than occurs upon the addition of sulfide to a secondary circuit.

The industry lacks an economical and efficient process for removing mercury from a secondary circuit of a cyanide leach, carbon-in-pulp precious metal recovery system. The industry also lacks a process for the removal of mercury from a cyanide solution that minimizes problems associated with subsequent gold purification steps such as distillation.

SUMMARY OF THE INVENTION

Figure 1:
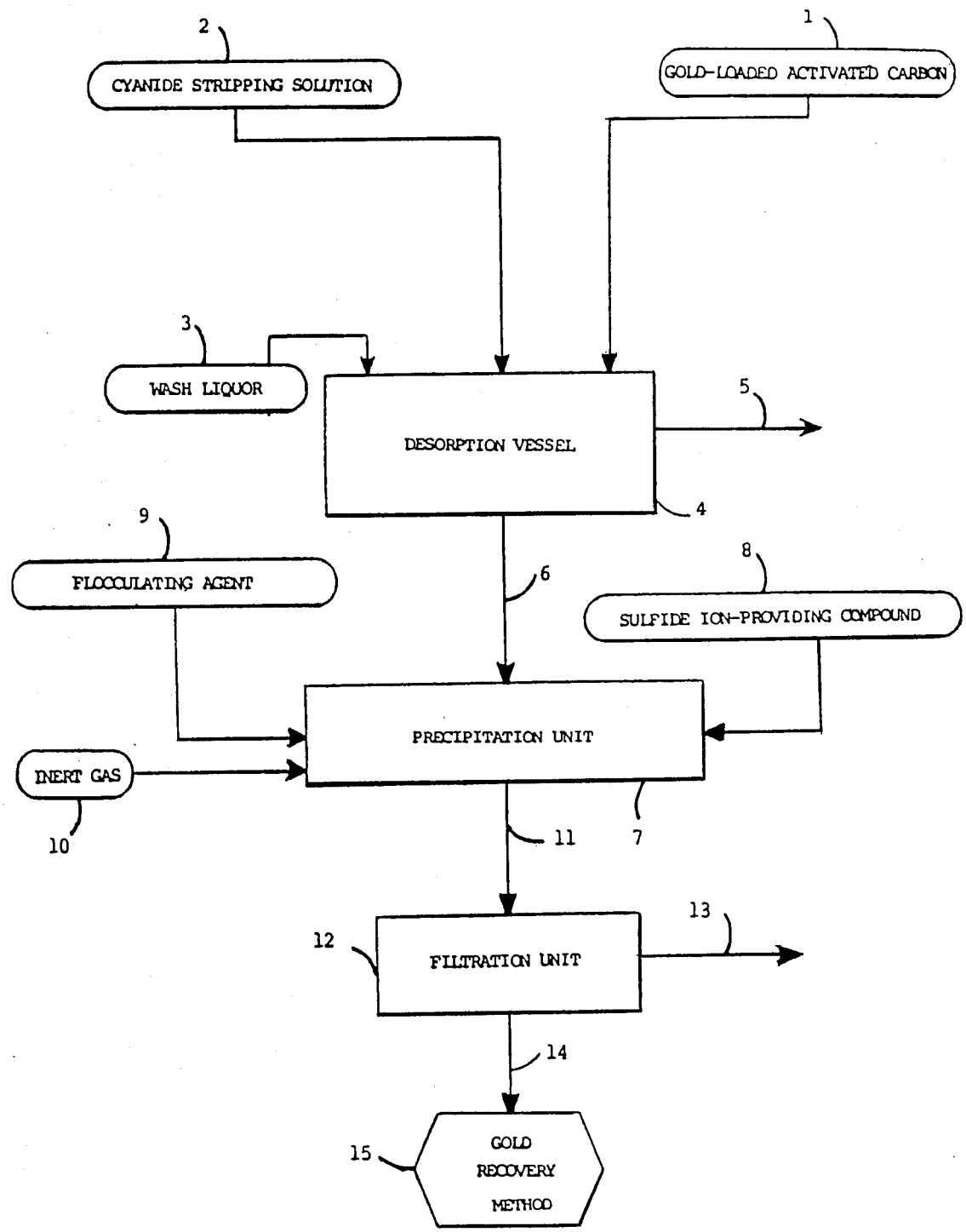
FIG. 1 is a flow diagram illustrating the preferred embodiment of the process of this invention wherein mercury is removed from a secondary circuit cyanide liquor of a cyanide leach, carbon-in-pulp gold recovery system.

This invention is an economical process for removing mercury from a cyanide solution. This process includes reacting solubilized mercury with a sulfide ion-providing compound in a precious metal-containing, cyanide leach solution to produce mercuric sulfide. The process then includes flocculating the mercuric sulfide with a flocculating agent whereby flocs of mercuric sulfide are formed to produce a substantially mercury-free precious metal-containing, cyanide solution. The process then includes separating the mercuric sulfide flocs from the substantially mercury-free precious metal-containing, cyanide solution.

In the preferred embodiment of this invention mercury is removed from the secondary circuit desorption liquor of a cyanide leach, carbon-in-pulp precious metal recovery system. The desorption liquor is produced by washing a precious metal and mercury-loaded activated carbon with a cyanide stripping solution. A mercury precipitating substance, such as a sulfide ion-providing compound that is preferably sodium sulfide ($Na_2S$), sodium hydrosulfide (NaHS) or hydrogen sulfide ($H_2S$), is added to the desorption liquor in an amount equal to between about 1.0 and about 1.5 times the stoichiometric amount necessary to chemically precipitate the mercury in the desorption liquor. The desorption liquor has a cyanide content between about 0.5% and about 2.0% by weight. A high molecular weight, high charge density, anionic polymer flocculating agent is added to the desorption liquor in a concentration of between about 0.1 parts per million and about 0.3 parts per million. The flocculating agent causes the mercury compounds suspended in the desorption liquor to form flocs. The precipitation of the mercury flocs is completed in between about 5 minutes and about 15 minutes. The reaction of this invention is peformed at a temperature between about 140° F. and about 180° F. Preferably the reaction is performed in solutions containing either no caustic agent or less than 2.0 grams per liter of a caustic agent such as sodium hydroxide (NaOH) to optimize the efficiency of mercuric sulfide precipitation. The mercuric sulfide precipitate is removed from the system by filtration or other means. The precious metals can then be separated from the desorption liquor by conventional processes.

DETAILED DESCRIPTION OF THE INVENTION

This invention is a process for removing mercury from a precious metal-containing cyanide solution. In this process mercury is reacted with a sulfide ion-providing compound in a precious metal-containing, cyanide leach solution. A flocculating agent is then added to the cyanide leach solution. The flocculating agent forms flocs with the mercuric sulfide and thereby produces a substantially mercury-free precious metal-containing, cyanide solution. The flocculated mercuric sulfide is then separated from the substantially mercury-free precious metal-containing, cyanide solution.

This invention is a process that is particularly useful for removing mercury from a desorption liquor of the secondary circuit of a cyanide leach, carbon-in-pulp precious metal recovery system. The desorption liquor from these systems is produced by washing a precious metal and mercury-loaded activated carbon with a cyanide solution. A sulfide ion-providing compound such as sodium sulfide ($Na_2S$), sodium hydrosulfide (NaHS), or hydrogen sulfide ($H_2S$) is added to the desorption liquor to react with the solubilized mercury. A suitable flocculating agent preferably having a high molecular weight, high charge density, anionic polymer is also added to the desorption liquor. The addition of the flocculating agent produces mercuric sulfide flocs and a substantially mercury-free precious metal-containing, cyanide solution. The flocs of mercuric sulfide settle more rapidly in a desorption liquor containing a flocculating agent than does a mercuric sulfide precipitate suspended in a desorption liquor without a flocculating agent.

The preferred embodiment of this invention is directed to the removal of mercury from gold-containing desorption liquors. Gold desorption liquors are representative of the behavior of other precious metal desorption liquors. The description of this invention in regard to the separation of mercury from gold desorption liquors is not intended to limit this invention to processes for the extraction of gold.

In the process of this invention the mercury precipitating compound can be one or more of numerous sulfide ion-providing compounds. Sulfide ions are desirable because they selectively react with solubilized mercury in a desorption liquor. Desirable sulfide ion-providing compounds are metal sulfide compounds and especially those which are a member selected from the group consisting of sodium sulfide ($Na_2S$), sodium hydrosulfide (NaHS), and hydrogen sulfide ($H_2S$).

Each of the three most desirable sulfide ion-providing compounds has its own individual characteristics. Sodium sulfide precipitates mercury efficiently and is relatively inexpensive when compared to other sulfide ion-providing compounds. Sodium sulfide is normally available as a solid. The most efficient use of sodium sulfide is obtained by dissolving it into an aqueous solution and pumping the solution into a reaction vessel. Sodium sulfide does not lower the pH of the desorption liquor and consequently no addition of a caustic agent is necessary to maintain an alkaline pH.

Sodium hydrosulfide is available commercially as a 45 percent concentrated liquid. As a concentrated liquid, sodium hydrosulfide can be easily and accurately fed to a reaction vessel by pumps without first having to be mixed into a solution. Sodium hydrosulfide has the undesirable effect of lowering the pH of the desorption liquor.

Hydrogen sulfide is commercially available as a gas. Gases such as hydrogen sulfide are not as easily added to a reaction vessel as is a liquid or solid material. Gases require more complex addition systems. Hydrogen sulfide also has the undesirable effect of lowering the pH of the desorption liquor.

The addition of the sulfide ion-providing compound to the desorption liquor is made in a quantity sufficient to react with the solubilized mercury in the desorption liquor. Effective quantities of sulfide ion-providing compounds are generally about 1 to about 1.5 times the stoichiometric amount of the compound required to react with the solubilized mercury in the desorption liquor. It is desirable to use quantities of the sulfide ion-providing compound that are slightly greater than the required stoichiometric amount because a portion of the free sulfide ions are bound by other contaminants and by cations in the desorption liquor.

The existing temperature of the desorption liquor is between about 140° F. (60° C.) and about 190° F. (88° C.) at this point in the process, but the invention is not limited to this temperature range. The "sulfiding" reaction occurs substantially immediately. It is desirable to allow at least one minute for this reaction to ensure nucleation and particle growth prior to adding a flocculating agent.

The chemical reaction of a sulfide ion-providing compound with solubilized mercury is characterized as follows:

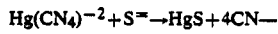

$$Hg(CN_4)^{-2} + S^= \rightarrow HgS + 4CN^-$$

Mercuric sulfide (HgS) is insoluble in water. The minute particles of mercuric sulfide formed in the desorption liquor do not readily precipitate from solution. These particles remain suspended because of Brownian movement and miscellaneous forces acting on the particles in solution.

In addition to the sulfide ion-providing compound a flocculating agent suitable for forming flocs of mercuric sulfide is added to the desorption liquor. The preferred flocculating agents are those considered by the industry to be high molecular weight, high charge density, anionic polyacrylamide polymers. Examples of polymers having these characteristics include the proprietary chemicals Betz ® 1120 and Polyhall ® 21J (formerly known by the mark Celanese ® 21J). The Betz ® 1120 product is a polymer of about 20 percent polyacrylate and about 80 percent polyacrylamide. The Polyhall ® 21J product is a partially hydrolyzed polyacrylamide polymer. The addition of the flocculating agent to the desorption liquor is desirably performed simultaneously with the addition of the sulfide ion-providing compound or shortly thereafter. The flocculating agent is added to the desorption liquor in a quantity sufficient to form flocs of substantially all of the suspended mercuric sulfide. The flocculating agent is desirably added to the desorption liquor in a concentration of between about 0.1 parts per million and about 0.3 parts per million.

The flocculating agents selected according to this invention make the mercuric sulfide suspended in the desorption liquor amenable to agglomeration and settling. Flocculating agents perform this function by affecting the surface potential of the particles in solution such that the particles are attracted to one another to form loose aggregates or flocs. The flocs are heavier than the suspended mercuric sulfide particles and rapidly settle into a loosely packed sediment. The formation of a sediment composed of the flocculating agent and mercuric sulfide produces a supernatant liquid that is a substantially mercury-free precious metal-containing, cyanide solution.

It is desirable to keep the concentration of caustic agents in the desorption liquor as low as possible during flocculation. Increasing the alkalinity of the desorption liquor inhibits the reaction of sulfide ions with mercury and interfers with the effectiveness of the flocculating agent. The desired concentration of caustic agents, expressed as sodium hydroxide, is less than 2.0 grams per liter.

The flocculated mercuric sulfide settles rapidly and is easily separated from the desorption liquor. The flocculated mercuric sulfide can be separated from the desorption liquor by filtration devices, siphoning devices, or other suitable means for separating precipitated matter from supernatant liquids.

FIG. 1 is a flow diagram illustrating the preferred mode of operation of the process of this invention. FIG. 1 illustrates a secondary circuit which occurs after the extraction or leaching of the gold from an ore has occurred in the primary circuit of a cyanide leach, carbon-in-pulp gold recovery system. After the gold is leached from the ore, the leached, solubilized gold is adsorbed onto granular activated carbon. The gold-loaded activated carbon 1 is fed into a desorption vessel 4. A cyanide stripping solution 2, is also fed into the desorption vessel 4. A contact time of at least one hour is allowed between the stripping solution and the gold-loaded carbon. Following this "presoak" step, a wash liquor 3 from the desorption vessel 4 is continuously recycled through the desorption vessel 4. These conditions "strip" or solubilize the gold, mercury, and other materials from the activated carbon. The cyanide solution of solubilized gold is the secondary circuit desorption liquor. The secondary circuit desorption liquor typically contains between 0.5% and 2.0% dissolved cyanide. The depleted carbon is removed from the desorption vessel 4 through line 5 to a means for regenerating the carbon (not shown). It should be understood that the steps of the process performed in the primary circuit and in the desorption steps (described above) are not part of our invention. For details on these procedural steps can be obtained from the Matson patent.

The precipitation unit 7 receives the desorption liquor through line 6. The desorption liquor contains solubilized gold, mercury, and other materials. The precipitation unit 7 can be a tank or other vessel. A mercury precipitation procedure can be performed in this invention by either a batch operation or a continuous flow operation. When a continuous flow operation is used the precipitation unit 7 desirably has sufficient volume to retain the desorption stream for an average of between about 5 minutes and about 15 minutes. This residence time of the desorption liquor in the precipitation unit 7 is sufficient to ensure complete flocculation of the mercury sulfide.

A sulfide ion-providing compound 8 such as sodium sulfide, sodium hydrosulfide, or hydrogen sulfide is added to the desorption liquor in the precipitation unit 7. In addition to the sulfide ion-providing compound 8, a flocculating agent 9 is added to the precipitation unit 7. The atmosphere within the precipitation unit 7 is preferably an inert gas which can be supplied by an inert gas source 10. An inert atmosphere prevents the oxidation of sulfide compounds in the desorption liquor. The mercuric sulfide precipitate redissolves in an oxygen atmosphere. Nitrogen gas ($N_2$) is an inert gas acceptable for use with this invention.

The precipitation solution or supernatant liquid formed in the precipitation unit 7 enters a filtration unit 12 through a line 11. The mercuric sulfide sediment is separated from the precipitation solution and transferred through a line 13 to a mercuric sulfide receiving vessel (not shown). Separation can be accomplished by vacuum filtration or other means. The resulting substantially mercury-free, gold-containing desorption liquor is transferred through a line 14 for further processing by a means 15 for conducting a conventional gold recovery operation.

The following examples illustrate the effectiveness of the process of the present invention and are not intended to limit the invention.

EXAMPLE I

This example illustrates the preferred embodiment of the process of this invention. A desorption liquor from the secondary circuit of a cyanide leach, carbon-in-pulp gold recovery system is used in this example. The chemical analysis of the desorption liquor is presented in Table I.

TABLE I
CHEMICAL ANALYSIS OF DESORPTION LIQUOR

Gold—178 milligrams per liter
Mercury—630 milligrams per liter
NaCN—30 grams per liter
Zn—3100 milligrams per liter
pH—10.2

Two hundred milliliters of the desorption liquor were placed in a tall 400 milliliter glass beaker and heated on an electric laboratory hot plate to 140° F. The desorption liquor during heating was agitated at 300 revolutions per minute with an electrically driven, three blade laboratory stirrer. An inert nitrogen atmosphere was maintained in the vapor space of the beaker. This atmosphere was maintained by slow injection of nitrogen gas from a pressurized cylinder through stainless steel tubing into the vapor space of the beaker. Powdered sodium sulfide was then added to the desorption liquor at the rate of 0.30 grams per liter with continued agitation. This addition represents 1.22 times the stoichiometric amount necessary to chemically precipitate the mercury present in the solution. After one minute a flocculating agent, Betz ® Flocculant Type 1120, was added to the desorption liquor with agitation to provide a concentration of 0.3 parts per million. The agitation was reduced after ten minutes to 150 revolutions per minute. The agitation was stopped five minutes later and the precipitate or flocs were allowed to settle. The desorption liquor was then vacuum filtered using a perforated 25 milliliter Gooch crucible and a 500 milliliter side arm filtration flask. W&R Blastom 2.5 centimeter Filter Paper Number 543 was used to separate or filter the flocs. The filtrate was analyzed for mercury and found to contain 0.7 milligrams per liter. This represents a mercury removal of 99.9 percent.

EXAMPLE II

The same desorption liquor used in Example I was also used in this example. The same procedure as used in Example I was used for this example except that a smaller amount of sodium sulfide was added to the desorption liquor. This example used 0.18 grams of sodium sulfide per liter of desorption liquor or 0.74 times the stoichiometric amount required to react with the mercury present in the desorption liquor. After flocculation and separation of the settled flocs, analysis indicated that only 68.7 percent of the mercury was removed from the desorption liquor. This example illustrates the necessity to use a concentration of sodium sulfide higher than 0.74 times the stoichiometric amount required to react with mercury.

EXAMPLE III AND COMPARATIVE EXAMPLE A

These examples illustrate the relative effect of using and not using a flocculating agent to remove mercuric sulfide from a desorption liquor. Two tests were performed. The first test represents Example III and uses a flocculating agent. The second test represents comparative Example A and does not use a flocculating agent. Comparative Example A does not represent the invention.

The same procedure used in Examples I and II was used in these examples with the exception that the addition of sodium sulfide was 1.33 times the stoichiometric amount required to react with the mercury in the desorption liquor. The temperature of the desorption liquor was maintained at 190° F. for both Example III and Comparative Example A. Polyhull ® 21J was the flocculating agent used in Example III. The analysis of the desorption liquor used in both Example III and Comparative Example A is presented in Table II.

TABLE II
CHEMICAL ANALYSIS OF DESORPTION LIQUOR

Gold—240 milligrams per liter
Mercury—129 milligrams per liter
NaCN—1,400 milligrams per liter
Zn—1,400 milligrams per liter
pH—10.5

In Example III 97.59 percent of the mercury was removed from the desorption liquor. The mercuric sulfide particles formed large flocs that settled within 10 seconds and resisted resuspension into the desorption liquor.

In Comparative Example A 97.05 percent of the mercury was removed from the desorption liquor. The mercuric sulfide precipitate particles were very fine and settled more slowly than the flocculated particles of Example III. Settling time for the mercuric sulfide particles of Comparative Example A was 15 seconds. The precipitated mercuric sulfide particles of Comparative Example A had a physical property which caused the particles to easily become resuspended in the desorption liquor. This physical property of the mercuric sulfide particles caused difficulties in the separation of the precipitate from the desorption liquor.

These examples demonstrate that the use of a flocculating agent improves the physical characteristics of a mercuric sulfide precipitate and causes that mercuric sulfide precipitate to be easily "handled" or separated from a desorption liquor.

EXAMPLE IV AND COMPARATIVE EXAMPLE B

The same desorption liquor and the same procedure as used in Example III and Comparative Example A were used in these examples except that sodium hydroxide (NaOH) was added to the desorption liquor to obtain a pH 13. A pH 13 is representative of some desorption liquors used in the gold extraction industry.

Example IV uses a flocculating agent. In this example 97.59 percent of the mercury in the desorption liquor was removed as a flocculated precipitate. The flocs settled in 10 seconds.

Comparative Example B used a flocculating agent. In this example 95.03 percent of the mercury in the desorption liquor was removed. The precipitate of Comparative Example B required 20 seconds to settle and tended to become resuspended in the desorption liquor when the liquor was shaken.

These examples demonstrate that the flocs of mercuric sulfide formed in a "caustic" or strongly alkaline desorption liquor have more desirable physical characteristics than an unflocculated mercuric sulfide precipitate formed in a caustic desorption liquor.

What is claimed is:

1. A process for removing mercury from a cyanide solution comprising:
   (a) reacting solubilized mercury with a sulfide ion-providing compound in a precious metal-containing, cyanide leach solution to produce mercuric sulfide, said sulfide ion-providing compound being a member selected from the group consisting of sodium sulfide, sodium hydrosulfide, and hydrogen sulfide;
   (b) flocculating said mercuric sulfide with a flocculating agent, said flocculating agent being an anionic, high molecular polyacrylamide polymer, whereby flocs of mercuric sulfide are formed to produce a mercury-free precious metal-containing, cyanide solution; and
   (c) separating said mercuric sulfide flocs from said mercury-free precious metal-containing, cyanide solution.

2. A process according to claim 1, wherein said flocculating agent is added to said precious metal containing cyanide solution in an amount equal to between about 0.1 parts per million and 0.3 parts per million of said precious metal-containing, cyanide solution.

3. A process according to claim 2, wherein said flocculating is performed for between about 5 minutes and about 15 minutes.

4. A process according to claim 3, wherein said precious metal-containing cyanide solution has a cyanide concentration of between about 0.5 percent and about 2.0 percent by weight.

5. A process for removing mercury from a desorption liquor of a precious metal recovery process comprising:
   (a) adding a sulfide ion-providing compound to said desorption liquor, said sulfide ion-providing compound being a member selected from the group consisting of sodium sulfide, sodium hydrosulfide, and hydrogen sulfide, whereby a mercury compound is formed;
   (b) flocculating said mercury compound in said desorption liquor with a high molecular weight, high charge density, anionic polyacrylamide polymer flocculating agent whereby flocs of said mercury compound are formed and a mercury-free desorption liquor is formed; and
   (c) separating said flocs of said mercury compound from said mercury-free desorption liquor.

6. A process according to claim 5, wherein said desorption liquor has a cyanide concentration of between about 0.5 percent and about 2.0 percent by weight.

7. A process according to claim 6, wherein said sulfide ion-providing compound is added in an amount sufficient to supply between about 1.0 and about 1.5 times the stoichiometric amount of mercury precipitating compound required to form said mercury compound.

8. A process according to claim 7, wherein said flocculating agent is added to said desorption liquor in an amount equal to between about 0.1 parts per million and 0.3 parts per million of said desorption liquor.

9. A process according to claim 8, wherein said flocculating is performed for between about 5 minutes and about 15 minutes.

10. A process for removing mercury from a desorption liquor of a gold recovery process comprising:
   (a) leaching and adsorbing simultaneously gold and mercury from a carbonaceous gold-containing ore onto activated carbon in a first cyanide solution, said first cyanide solution having a cyanide concentration of between about 0.01 percent and about 0.1 percent by weight;
   (b) separating said gold and mercury-loaded activated carbon from said leached carbonaceous ore;
   (c) desorbing said gold and mercury from said activated carbon with a second cyanide solution, said second cyanide solution having a cyanide concentration of between about 0.5 percent and about 2.0 percent and having an alkaline pH;
   (d) adding sulfide ion-providing compound to said gold-containing, cyanide desorption solution in an amount equal to between about 1.0 and about 1.5 times a stoichiometric amount required to react with said desorbed mercury, whereby mercuric sulfide is formed, said sulfide ion-providing compound being a member selected from the group consisting of sodium sulfide, sodium hydrosulfide, and hydrogen sulfide;
   (e) flocculating said mercuric sulfide in said gold-containing, cyanide solution with a high density, high charge, anionic polyacrylamide polymer flocculating agent whereby flocs of said mercuric sulfide are formed and a mercury-free gold-containing, cyanide solution is formed, said high density, high charge, anionic polymer flocculating agent being added to said cyanide solution in an amount equal to between about 0.1 parts per million and about 0.3 parts per million of said cyanide solution, said flocculating being performed for between about 5 minutes and about 15 minutes at a temperature of between about 140° F. and about 180° F.; and
   (f) separating said mercuric sulfide flocs from said mercury-free gold-containing, cyanide solution.

* * * * *

UNITED STATES PATENT AND TRADEMARK OFFICE
CERTIFICATE OF CORRECTION

PATENT NO. : 4,726,939

DATED : February 23, 1988

INVENTOR(S) : Touro et al.

It is certified that error appears in the above-identified patent and that said Letters Patent is hereby corrected as shown below:

ON THE TITLE PAGE INSERT:
-- Assignee: FREEPORT MINERALS COMPANY
New Orleans, Louisiana --.

Signed and Sealed this

Second Day of August, 1988

Attest:

DONALD J. QUIGG

*Attesting Officer*   *Commissioner of Patents and Trademarks*